United States Patent [19]

Hayashi

[11] Patent Number: 4,783,338

[45] Date of Patent: Nov. 8, 1988

[54] METHOD OF PRODUCING FILLING MATERIAL-CONTAINING BREAD

[75] Inventor: Torahiko Hayashi, Utsunomiya, Japan

[73] Assignee: Rheon Automatic Machinery Co., Ltd., Japan

[21] Appl. No.: 149,921

[22] Filed: Jan. 29, 1988

Related U.S. Application Data

[63] Continuation of Ser. No. 831,587, Feb. 21, 1986.

[30] Foreign Application Priority Data

Feb. 24, 1985 [JP] Japan ................................ 60-34847

[51] Int. Cl.⁴ .................... A21D 13/00; A21C 15/00
[52] U.S. Cl. ...................................... 426/94; 426/138; 426/283; 426/284; 426/297
[58] Field of Search ................. 426/94, 138, 283, 284, 426/297, 281, 282

[56] References Cited

U.S. PATENT DOCUMENTS

| | | | |
|---|---|---|---|
| 1,589,850 | 6/1926 | Haskell | 426/138 |
| 3,219,456 | 11/1965 | Matz et al. | 426/297 |
| 3,821,452 | 6/1974 | Hayashi | 426/283 |
| 4,162,333 | 7/1979 | Nelson et al. | 426/283 |
| 4,275,647 | 6/1981 | Chambers | 426/94 |
| 4,283,430 | 8/1981 | Doster | 426/94 |
| 4,416,910 | 11/1983 | Hayashi et al. | 426/283 |

*Primary Examiner*—Jeanette Hunter
*Attorney, Agent, or Firm*—Finnegan, Henderson, Farabow, Garrett and Dunner

[57] ABSTRACT

A method of producing filling-containing baked bread is provided. A dough sheet having layers of fats and oils therein is formed, cut in desired dimensions, wound, and baked to form the bread having flexible layers therein into which a filling is introduced through a pipe.

The introduction of filling is done by inserting the pipe along the axis of the baked bread, so that the tip of the pipe can be easily entered into thin cavities formed by expanded gaseous material when baking the wound dough sheet, without damaging the whole shape of bread and without clogging the tip of the pipe with crumbs, whereby the filling material containing the solid, or the filling material consisting only of a solid, is introduced into the baked bread.

4 Claims, 1 Drawing Sheet

METHOD OF PRODUCING FILLING MATERIAL-CONTAINING BREAD

This application is a continuation of application Ser. No. 831,587 filed Feb. 21, 1986.

BACKGROUND OF THE INVENTION

1. Field of the Invention

The present invention relates to a method of producing inner material-containing bread, more particularly, to a method of introducing inner material consisting of fluid food and solid food or only of solid food, and furthermore, to a method of introducing inner material into baked bread without cutting or damaging the shape of the bread and without clogging the tip of a pipe which is used to insert the filling material into the bread.

2. Description of Prior Art

A combination of bread and inner material such as salad, known as sandwiches, and hamburgers, have hitherto been produced by placing the inner material between two slices of bread or by introducing the inner material onto the cut portion of bread. The inner material thus placed in the bread tends to be forced out of the bread by the pressure of teeth of a person who is eating such a hamburger or sandwich.

There has been previously attempt a method in which a pipe to insert the inner material into the bread is used. However, even a large amount of a fluid material cannot be received in the bread, and the tip of the pipe was liable to be clogged by crumbs. Furthermore, the inner material containing a large size of solid food could not be smoothly introduced into the bread, and was liable to overflow from the bore caused by the pipe and to break the bread if a large-sized pipe was used.

Production of the inner material-containing bread by a pipe insertion into the bread, accordingly, relies on a narrow nozzle through which only a fluid material is injected inside the bread.

SUMMARY OF THE INVENTION

An object of the present invention is to provide a method of producing inner material-containing bread.

Another object of the present invention is to provide a method of producing bread into which the inner material containing solid, or inner material consisting only of a solid, is introcuced.

A still further object of the present invention is to provide a method of producing the inner material-containing bread by inserting a pipe into bread and injecting the inner material into a plurality of cavities formed about the axis of the bread.

In one aspect of the present invention, a method of producing filling material-containing bread is provided, comprising forming a dough sheet comprising layers of dough and layers of fat and oils, cutting said dough sheet in desired dimensions, winding up said cut dough sheet, and baking the wound sheet, thereby preparing a loaf of bread inside which a plurality of cavities are disposed in a spiral form about the axis of the bread; further comprising inserting a pipe into said bread along said axis, and introducing a filling material containing solid food into said bread through said pipe, thereby producing the filling material-containing bread.

In the present invention, first, a desired shape of baked bread is prepared by forming a sheet of dough comprising layers of dough and layers of fats and oils, cutting the sheet, winding it up, and baking it.

A pipe is the introduced into the bread along the axis of the bread. Inside the bread, a plurality of flat cavities are formed about the axis thereof, which cavities are caused by expanded gaseous materials between thin films of fats and oils formed when baking the wound dough sheet, or even when fermentation is taking place.

An inner material, such as pieces of cucumbers, carrots, onions, grapes, strawberries, pieces of ham or cooked and diced meat, is injected through the pipe. The inner material is then introduced within cavities. The bread keeps its original shape even when a large amount of inner material is introduced inside it, as the pressure due to the injected inner material is absorbed by flexible layers comprising holes and thin films. According to the present invention, sanitary conditions of storage and transport can be maintained, as the inner material is introduced without cutting the baked bread.

DESCRIPTION OF THE PREFERRED EMBODIMENT

Figure 1:
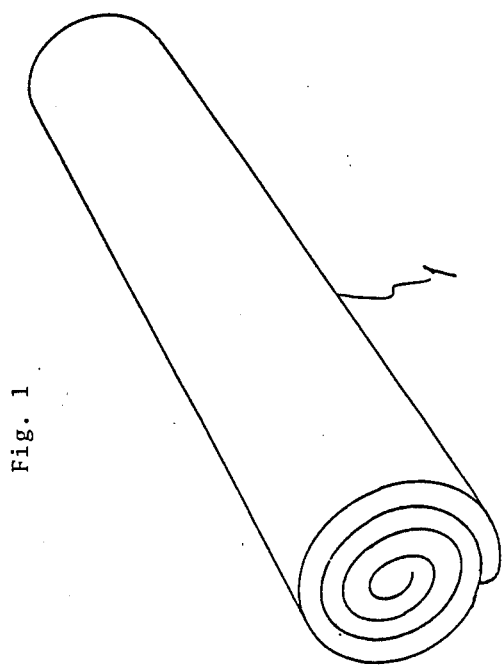
FIG. 1 illustrates a bar-like body 1 wound from a dough sheet having layers therein.

An embodiment of the present invention will now be described.

Bread dough with which yeast is blended and fats and oils are laminated to make parallel layers where thin films of dough and thin films of fats and oils are alternately formed so as to make a flat sheet of dough. The flat sheet of dough is then cut to make a desired shape, for instance, circular, hexagonal, square, or triangular, and cut pieces of dough are rolled up from an end thereof to form a bar-like body 1 as shown in FIG. 1. The body 1 is then aged in a proofer at 40° C. to 50° C. and baked in an oven.

A spiral arrangement of cavities is formed about the axis of the bread, preferably when the ratio of the fats and oils to the bread dough is 1:4 or more. The baked dough becomes a flexible special material in which a spiral arrangement of cavities is formed and has elasticity in the radial and outward direction about the axis of the bread. A large number of cavities are formed by expanded carbon dioxide caused by the fermentation of the yeast in the dough sheet between the layers of dough and the layers of fats and oils, even before the bar-like body is baked, and the cavity formation is promoted by baking the bar-like body.

The spiral arrangement of cavities can be produced in the bread even when yeast is not blended in the dough, because air bubbles in the dough sheet in a finely dipsersed condition are expanded to form a spiral arrangement of cavities. The taste of the bread with and without yeast differs, but in both breads cavities are formed and provide flexibility, and elasticity radially outwardly around the axis of the spiral.

A method of introducing the inner material into the spiral arrangement of cavities will now be described. A nozzle is inserted into the bread along the axis thereof. Because the nozzle is advanced along the axis of the spiral, no bread is broken by the insertion of the nozzle, or even by the introduction of a large amount of the inner material. If, once the nozzle is inserted to a point near the opposite end of the bread, the nozzle is retracted while extruding the inner material, and the material can thus be introduced through all the cavities in the inner portion of the bread.

Although the inner diameter of the nozzle depends of course on the size of the solid materials in the inner material, the flexibility or elasticity which radially appears outwardly about the axis the bread, permits the insertion of a relatively large size of nozzle, and the bore caused by the insertion of the nozzle shrinks somewhat. The bore, for example, in the side walls of bread, caused by the nozzle insertion in a direction perpendicular to the axis of the bread, does not so shrink.

Further, since a large number of cavities receive the inner material, and the flexibility due to the baked thin films of bread and cavities exists, the inserted inner material does not overflow from the bore caused by the nozzle.

Therefore, a relatively large size of solid food material is filled in almost the entire part of the bread.

Because the position of the bore caused by the nozzle insertion, according to the present invention, is in an end portion of the baked bread, the appearance of the finished bread is good. This appearance is also attributable to the shrinkage of the bore, which is opened to insert the inner material into the bread. For instance a pipe of an outer diameter of about 10 mm used to insert the inner material leaves a bore of an inner diameter of about 6 mm.

According to the present invention, new and fresh baked bread, inside of which various kinds of food materials are entirely confined, is provided, which finished bread products can be handled with ease and in a good sanitary condition.

Furthermore, an effective automatic production of the inner material-containing bread can be realized, if a quantitative feeder assembly is associated with the nozzle in the present invention.

In addition, if a large size pipe, in which solids can be extruded without any barrier, is used in the method of the present invention, the bread is not damaged, and the overflow of the inner material is prevented.

I claim:

1. A method of producing filling material-containing bread, comprising forming a dough sheet comprising layers of dough and layers of fats and oils, cutting said dough sheet in desired dimensions, winding up said cut dough sheet, and baking the wound sheet, thereby preparing a loaf of multi-layered crust layers in a spiral form about an axis of the bread; said method further comprising the steps of inserting a pipe into said bread to make a bore along said axis, and introducing a filling material containing solid food into said bore of said bread through said pipe, thereby producing the filling material-containing bread.

2. A method of filling material-containing bread comprising the steps of:
   forming a dough sheet by interposing layers of fats and oils with layers of dough,
   cutting said dough sheet in a desired shape and dimension,
   rolling said dough sheet in one direction,
   baking said rolled dough sheet into bread and causing cavities to be formed along adjoining surfaces of said dough layers, said fat and oil layers being disposed in a spiral form about an axis of said rolled dough sheet and said bread having elasticity in a radial and outward direction about said axis,
   inserting means for filling food material into said bread along the axis of the rolled dough sheet to form a bore, and
   filling said bore with said food material using said means for filling while retracting said means for filling out of said bread.

3. The method of producing filling material-containing bread as recited in claim 2, wherein:
   said means for filling is a pipe; and
   said food material consists essentially of solid food.

4. The method of producing filling material-containing bread as recited in claim 2, further comprising the steps, of aging said rolled dough sheet before the baking step; and
   shrinking the bore after the retracting step to a size about 60% of the size formed by the inserting step.

* * * * *